UNITED STATES PATENT OFFICE.

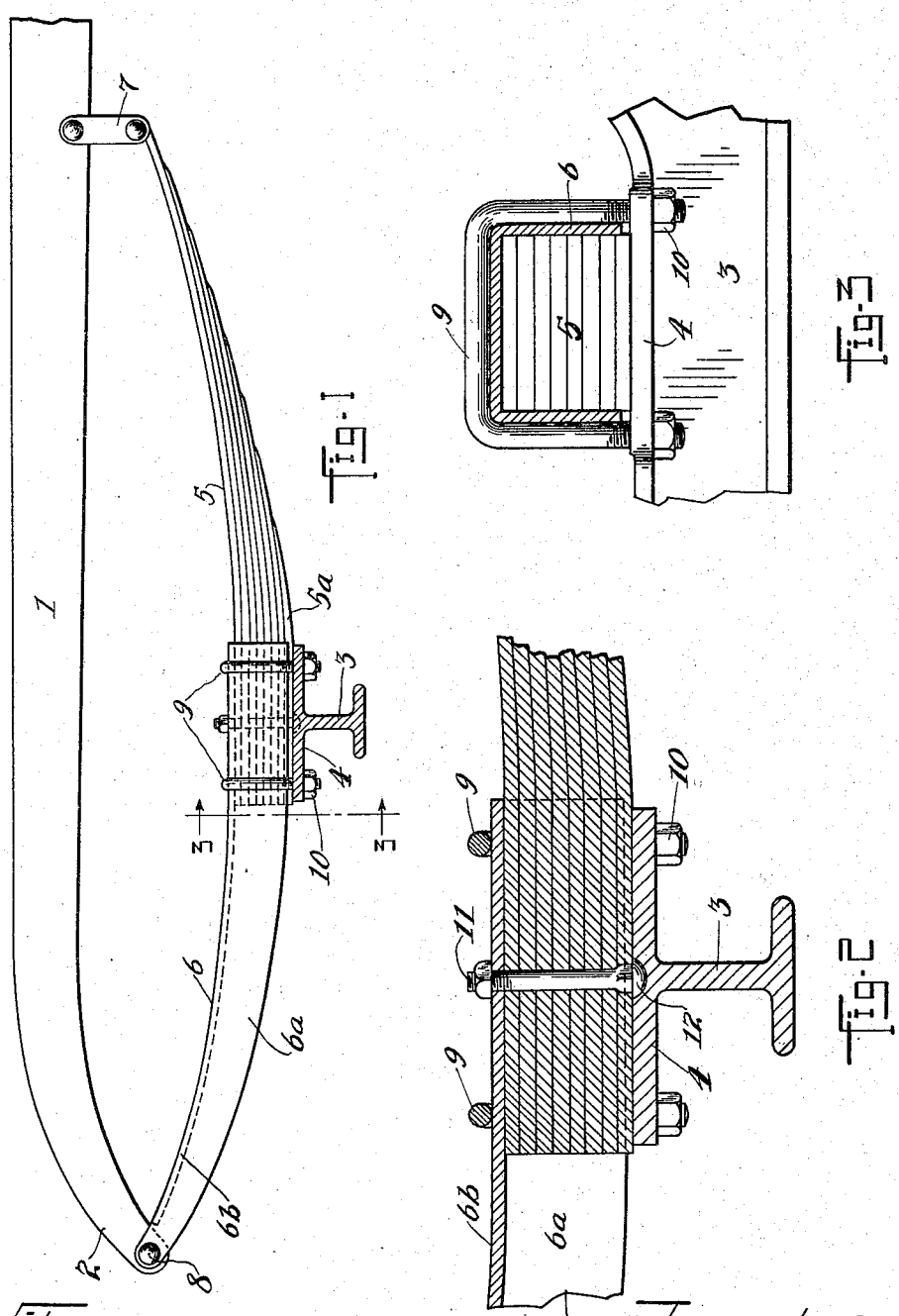

CHRISTIAN GIRL, OF CLEVELAND, OHIO, ASSIGNOR TO THE PERFECTION SPRING COMPANY, OF CLEVELAND, OHIO, A CORPORATION OF OHIO.

VEHICLE-SPRING.

1,174,313.     Specification of Letters Patent.     Patented Mar. 7, 1916.

Application filed May 6, 1914. Serial No. 836,632.

*To all whom it may concern:*

Be it known that I, CHRISTIAN GIRL, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs, and has for its object to provide a construction by which a definite radius action may be exerted between the vehicle axle and the frame whereby, in the case of the front axle of an automobile, the steering may be made more definite.

A further object of the invention is to provide a spring which, while affording substantially the same riding effect as one composed entirely of high-grade steel spring plates, it will employ a materially less quantity of such material, with a corresponding material reduction in the cost of the spring.

A further object of the invention is to provide for combining in a unitary construction a spring and a rigid radius rod.

I secure the foregoing and other objects, which will appear hereinafter, by the construction illustrated in the drawings forming part hereof, wherein—

Figure 1 represents a side elevation of the front end of an automobile frame, showing applied thereto and to the axle a composite spring and radius rod constructed in accordance with my invention, the axle being shown in section; Fig. 2 represents an enlarged sectional detail taken through the central portion which is connected to the axle; and Fig. 3 a transverse sectional view of the same portion of the spring, corresponding approximately to the line 3—3 of Fig. 1.

Describing by reference characters the various parts illustrated herein, 1 denotes the front end of the body frame of an automobile, said front end terminating in a horn or hanger 2.

3 denotes the front axle, the particular axle shown herein being of I-beam construction, the top flange of the beam being extended to form a spring seat, as indicated at 4. The spring which I employ is a composite spring and rigid radius rod and consists generally of a rear resilient section 5 and a front rigid section 6, these sections being connected together, preferably at the axle and in connection with the seat 4. The section 5 is of ordinary semi-elliptic construction and comprises a main plate and a sufficient number of auxiliary plates, the main plate being connected to the frame by means of a swinging shackle 7. The front ends of the spring plates comprising the rear section 5 project preferably entirely across the spring seat, with the bottom and shortest plate $5^a$ resting on said seat.

The front section 6 is preferably of channel-iron construction having the flanges $6^a$ projecting downwardly and the web $6^b$ at the top. The section $6^a$ is tapered from rear to front whereby it resembles in general outline the rear section and the front end of an ordinary semi-elliptic spring. The web $6^b$ may be cut away at the extreme front end of the section 6 to receive the spring horn or hanger 2 between the forks thus provided, a bolt 8 serving to connect the horn or hanger to this section 6. The rear end of the section 6 is of such dimensions as to receive snugly therewithin the front end of the section 5, the section 6 extending preferably entirely across the spring seat 4 and the overlapping portions of the sections 5 and 6 being connected together and to the seat by means of the clips 9 which extend around the rear end of the latter section and project through the spring seat, to which they are secured by means of nuts 10. The rear end of the section 6 will be of somewhat less depth than the front end of the section 5 whereby, on setting up on the nuts 10, the lower plate $5^a$ will be compressed against the spring seat. A center bolt 11 having a head 12 embedded in a recess in the top of the spring seat extends through the plates of the section 5 and the web $6^b$ of the section 6 and forms a positive and direct connection between the sections.

It has been found that, in operation, the sections 6 of the two front springs exert a definite radius action between the frame and the axle, whereby the steering qualities are markedly improved. It has also been found that practically the same riding qualities are secured with springs of this type as with springs composed entirely of plates. Obviously, the substitution of the channel steel member 5 for half of a multi-leaf spring made of high grade steel effects a material saving in the cost of the spring; but, as pointed out hereinbefore, my construction renders possible to combine economy of production with ease of riding.

Having thus described my invention, what I claim is:—

1. A combined spring and radius rod comprising two rigidly connected sections, one of said sections being in effect half of a multi-leaf spring which is connected at substantially the point of greatest cross sectional area with the rigid section, the rigid section comprising a channel member which is adapted to receive therewithin the enlarged portion of the first mentioned section.

2. A combined spring and radius rod comprising two sections, one of said sections being in effect half of a multi-leaf semi-elliptic spring and the other section comprising a channel member, the channel member receiving therewithin the enlarged end of the first mentioned section, and means rigidly connecting the overlapping ends of said section.

3. The combination, with a vehicle frame and axle, of a combined spring and radius rod comprising a pair of sections, one of said sections consisting of a plurality of spring leaves, the last-mentioned section being connected at its reduced end to the frame and the other section comprising a channel member which is adapted to receive therewithin the enlarged end of the first section, means rigidly connecting the overlapping portions of said sections, means connecting the said overlapping portions to the axle, and a connection between the frame and the end of the second section which is remote from the axle.

4. The combination, with a vehicle frame and axle, of a composite spring and radius rod comprising a section consisting in effect of half a multi-leaf spring having its reduced end connected to the frame and a channel shaped second section having one end overlapping and receiving therewithin the enlarged end of the first section, means connecting said sections together, means connecting the overlapping portions of the sections to the axle, and a connection between the second section and the frame.

5. The combination, with a vehicle frame and axle, of a composite spring and radius rod comprising a rear section consisting in effect of half a multi-leaf spring having its rear end connected to the frame and its enlarged front end extending to and overlapping the axle and a channel-shaped front section having its rear end extending to and overlapping the axle and receiving therewithin the front end of the first section, means connecting said sections together, means connecting the overlapping portions of the sections to the axle, and a connection between the front end of the second section and the frame.

6. The combination, with the frame and the axle of a vehicle, of a composite spring and radius rod comprising a resilient section which is connected at one end to the frame and a rigid section which is also connected at one end to the frame, said sections overlapping and being rigidly connected together, and means connecting the overlapping portions of the sections to the axle.

7. A composite spring and radius rod comprising a resilient section, made up of a multiplicity of leaves, and a rigid section, the rigid section having a hollow portion adapted to receive therewithin the body portion or enlarged end of the resilient section, and means connecting the overlapping portions of said sections.

8. A composite spring and radius rod comprising a resilient section having a plurality of leaves, and a rigid section, said rigid section having a channel-shaped portion adapted to receive therewithin the enlarged or body portion of the resilient section, and means connecting the overlapping portions of the sections.

In testimony whereof, I hereunto affix my signature in the presence of two witnesses.

CHRISTIAN GIRL.

Witnesses:
W. E. PERRINE,
JOHN G. UTZ.

Copies of this patent may be obtained for five cents each, by addressing the "Commissioner of Patents, Washington, D. C."